(12) United States Patent
Allen

(10) Patent No.: US 10,005,484 B2
(45) Date of Patent: Jun. 26, 2018

(54) SEAL ASSEMBLY

(71) Applicant: GM GLOBAL TECHNOLOGY OPERATIONS LLC, Detroit, MI (US)

(72) Inventor: Todd E. Allen, Lake Orion, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 76 days.

(21) Appl. No.: 15/346,755

(22) Filed: Nov. 9, 2016

(65) Prior Publication Data

US 2018/0127017 A1 May 10, 2018

(51) Int. Cl.
B62D 1/16 (2006.01)

(52) U.S. Cl.
CPC ...................... B62D 1/16 (2013.01)

(58) Field of Classification Search
USPC ........................... 280/779; 464/173; 277/634
See application file for complete search history.

(56) References Cited

U.S. PATENT DOCUMENTS

| | | | | |
|---|---|---|---|---|
| 6,056,297 A * | 5/2000 | Harkrader | ................ | F16J 3/041 277/634 |
| 8,469,399 B2 | 6/2013 | Allen | | |
| 8,888,132 B2 * | 11/2014 | Allen | ...................... | B62D 1/16 277/634 |
| 9,216,759 B2 * | 12/2015 | Kim | .......................... | F16D 3/84 |
| 9,669,882 B2 * | 6/2017 | Allen | ..................... | B62D 25/02 |
| 9,752,684 B2 * | 9/2017 | Allen | ...................... | B62D 1/16 |
| 2006/0108782 A1 * | 5/2006 | Kanazawa | .......... | B60R 13/0846 280/779 |
| 2006/0199653 A1 * | 9/2006 | Terashima | .............. | B60R 13/02 464/173 |
| 2008/0054573 A1 * | 3/2008 | Yamamoto | ........... | F16J 15/3224 277/594 |
| 2015/0135598 A1 * | 5/2015 | Jatzke | .................... | B62D 25/24 49/463 |
| 2016/0245410 A1 * | 8/2016 | Hoehle | .................. | F16J 15/445 |
| 2016/0281855 A1 * | 9/2016 | Didwiszus | ............. | F16J 15/164 |
| 2017/0234434 A1 * | 8/2017 | Shuto | ...................... | B62D 1/16 277/504 |

* cited by examiner

Primary Examiner — Toan To
(74) Attorney, Agent, or Firm — Quinn IP Law

(57) ABSTRACT

A seal assembly includes a body having a wall. The body includes a detent that is attached to the wall at a hinge. The detent is bendable about the hinge in a radial direction relative to a central axis. A locking pin is supported by a post extending from the body, and is axially moveable along the central axis, between an insertion position and a locking position. When in the insertion position, the locking pin is disengaged from the detent to allow the detent to bend about the hinge. When disposed in the locking position, the locking pin is engaged with the detent to prevent the detent from bending about the hinge. The post and/or the locking pin include a tactile feature to provide tactile feedback when the locking pin is moved between the insertion position and the locking position.

19 Claims, 5 Drawing Sheets

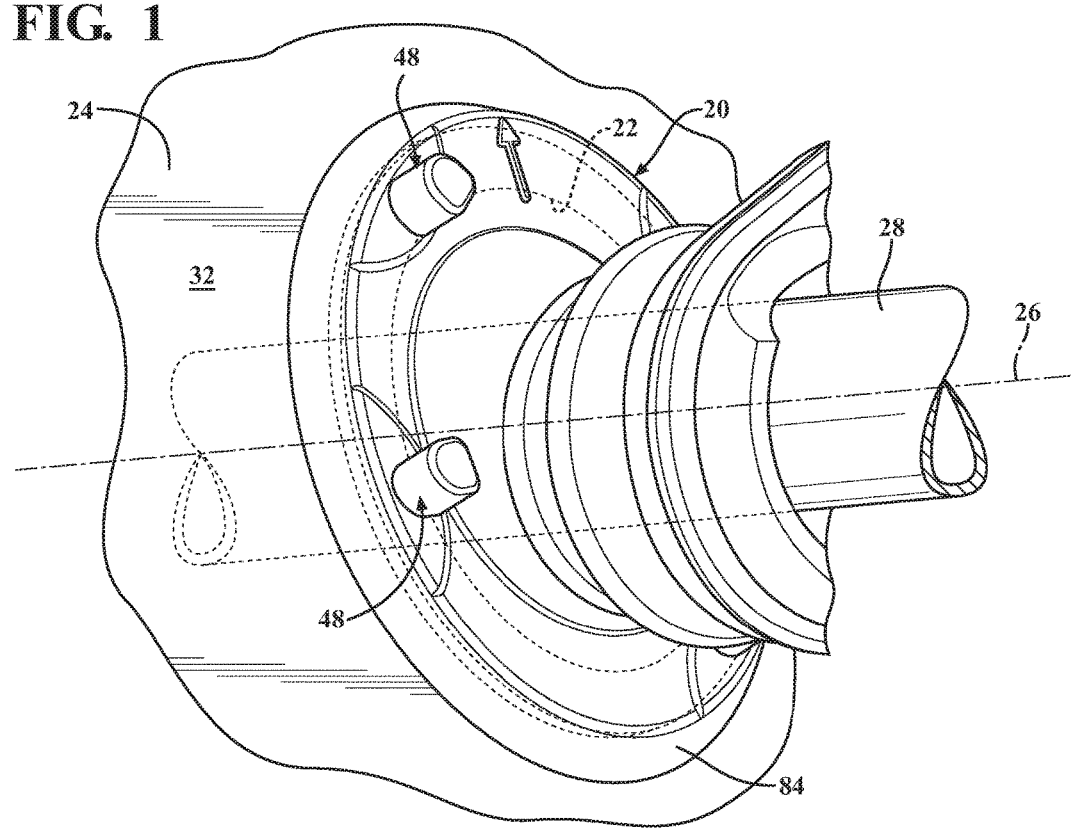
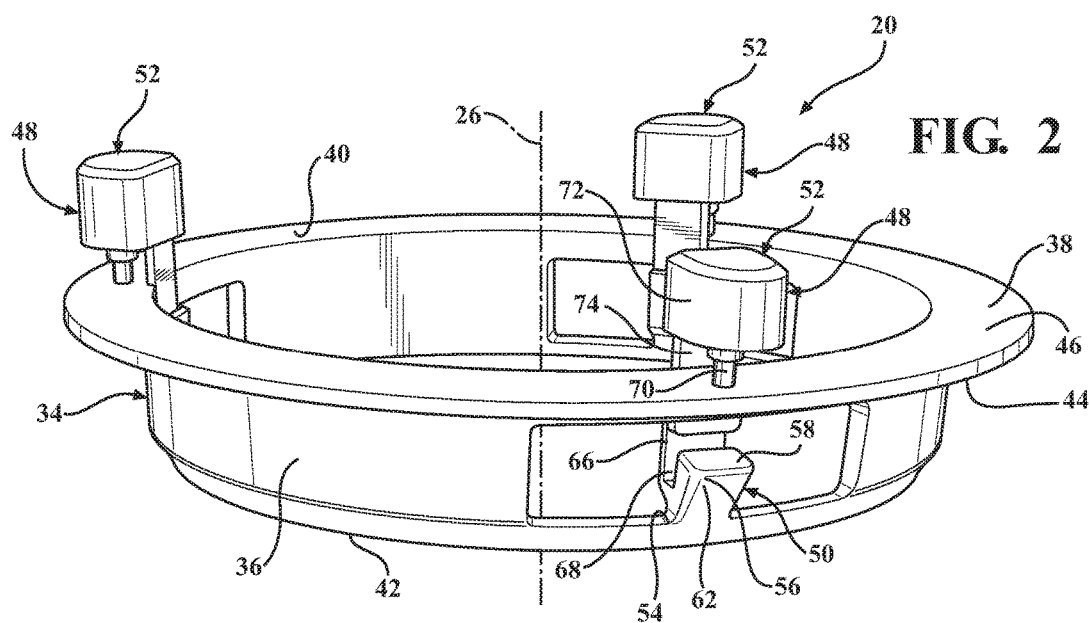

SEAL ASSEMBLY

TECHNICAL FIELD

The disclosure generally relates to a seal assembly for sealing an opening in a panel, with a shaft extending through the opening.

BACKGROUND

Motor vehicles often includes a dash panel or bulkhead, which separates a passenger compartment from an engine compartment. A steering shaft passes through an opening in the bulkhead to connect a steering wheel, located is in the passenger compartment, to a steering gear, located in the engine compartment. A seal assembly is typically used to seal the opening in the bulkhead around the steering shaft, to prevent noise, gases, water, and other debris from entering the passenger compartment from the engine compartment, through the opening in the bulkhead.

SUMMARY

A seal assembly is provided. The seal assembly seals between a panel and a shaft extending through an opening in the panel. The seal assembly includes a body having a wall extending along a central axis, between a first end and a second end. The body further includes a flange attached to the first end of the wall, and extending outward from the wall and away from the central axis. The body includes a detent that is attached to the wall at a hinge, which is disposed adjacent the second end of the wall. The detent is bendable about the hinge in a radial direction relative to the central axis. A locking pin is axially moveable along the central axis, between an insertion position and a locking position. When the locking pin is disposed in the insertion position, the locking pin is disengaged from the detent to allow the detent to bend about the hinge relative to the central axis. When the locking pin is disposed in the locking position, the locking pin is engaged with the detent to prevent the detent from bending about the hinge relative to the central axis.

A vehicle is also provided. The vehicle includes a panel defining an opening extending through the panel along a central axis. The panel has an interior surface and an exterior surface. A shaft extends through the opening in the panel. A seal assembly interconnects the shaft and the panel, and seals the opening in the panel, between the panel and the shaft. The seal assembly includes a body having a wall that extends along the central axis, between a first end and a second end. A flange is attached to the first end of the wall, and extends outward from the wall and away from the central axis. The flange has a first surface disposed against the interior surface of the panel, and an opposing second surface. The body includes a latching feature having a detent and a locking pin. The detent is attached to the wall at a hinge, which is disposed adjacent the second end of the wall. The detent is bendable about the hinge in a radial direction relative to the central axis. The locking pin is axially moveable along the central axis, between an insertion position and a locking position. When the locking pin is disposed in the insertion position, the locking pin is disengaged from the detent to allow the detent to bend about the hinge relative to the central axis. When the locking pin is disposed in the locking position, the locking pin is engaged with the detent to prevent the detent from bending about the hinge relative to the central axis. A seal member is attached to the flange, and is disposed in sealing engagement with the shaft.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

FIG. 1 is a schematic perspective view of a seal assembly sealing against a panel and a shaft extending through an opening in the panel.

FIG. 2 is a schematic perspective view of a body of the seal assembly positioned within the opening of the panel.

DETAILED DESCRIPTION

Figure 3:
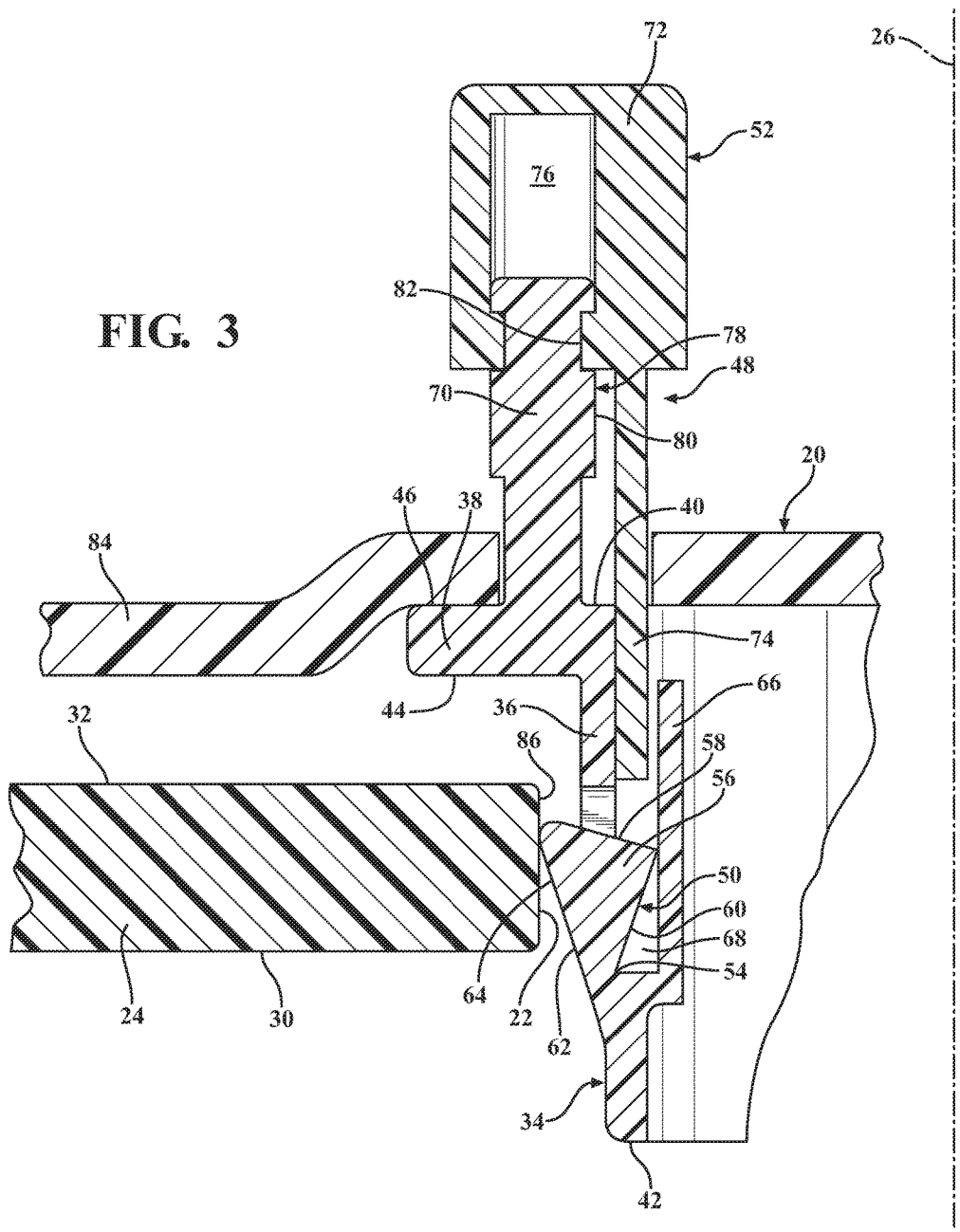
FIG. 3 is a schematic fragmentary cross sectional view of the seal assembly being inserted through the opening in the panel, with a locking pin in an insertion position.

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Referring to the Figures, wherein like numerals indicate like parts throughout the several views, a seal assembly is generally shown at 20. Referring to FIG. 1, the seal assembly 20 seals an opening 22 in a panel 24. The panel 24 defines the opening 22, which extends through the panel 24 along a central axis 26. A shaft 28 may extend through the opening 22 in the panel 24, with the seal assembly 20 sealing the opening 22, between the panel 24 and the shaft 28. The panel 24 may include for example, but is not limited to, a bulkhead or dash panel 24 of a vehicle. The vehicle may include any moveable platform, such as but not limited to an automobile, a truck, a tractor, an ATV, a UTV, a motorcycle, a plane, a train, etc. The shaft 28 may include for example, but is not limited to, a steering shaft 28. While the seal assembly 20 is described and shown herein as sealing the opening 22 in a bulkhead of a vehicle, between the bulkhead and the steering shaft 28, it should be appreciated that the seal assembly 20 may be used in some other context for sealing an opening 22 in some other panel 24. The seal assembly 20 may be used for some other automotive purpose, or for a non-automotive purpose. Accordingly, the scope of the description should not be limited to the exemplary embodiment described herein.

Figure 4:
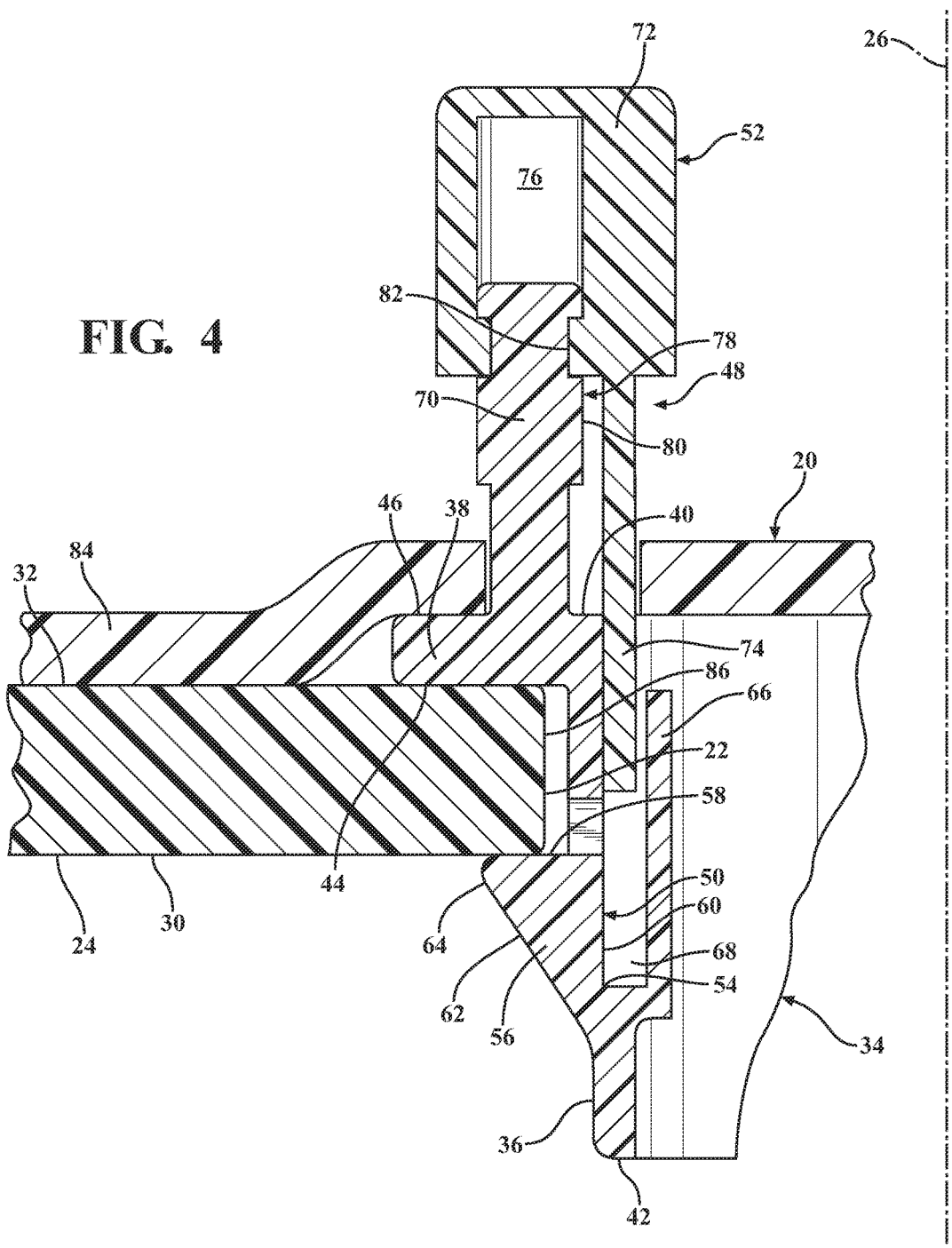
FIG. 4 is a schematic fragmentary cross sectional view of the seal assembly positioned within the opening of the panel, showing the locking pin in the insertion position.
Figure 5:
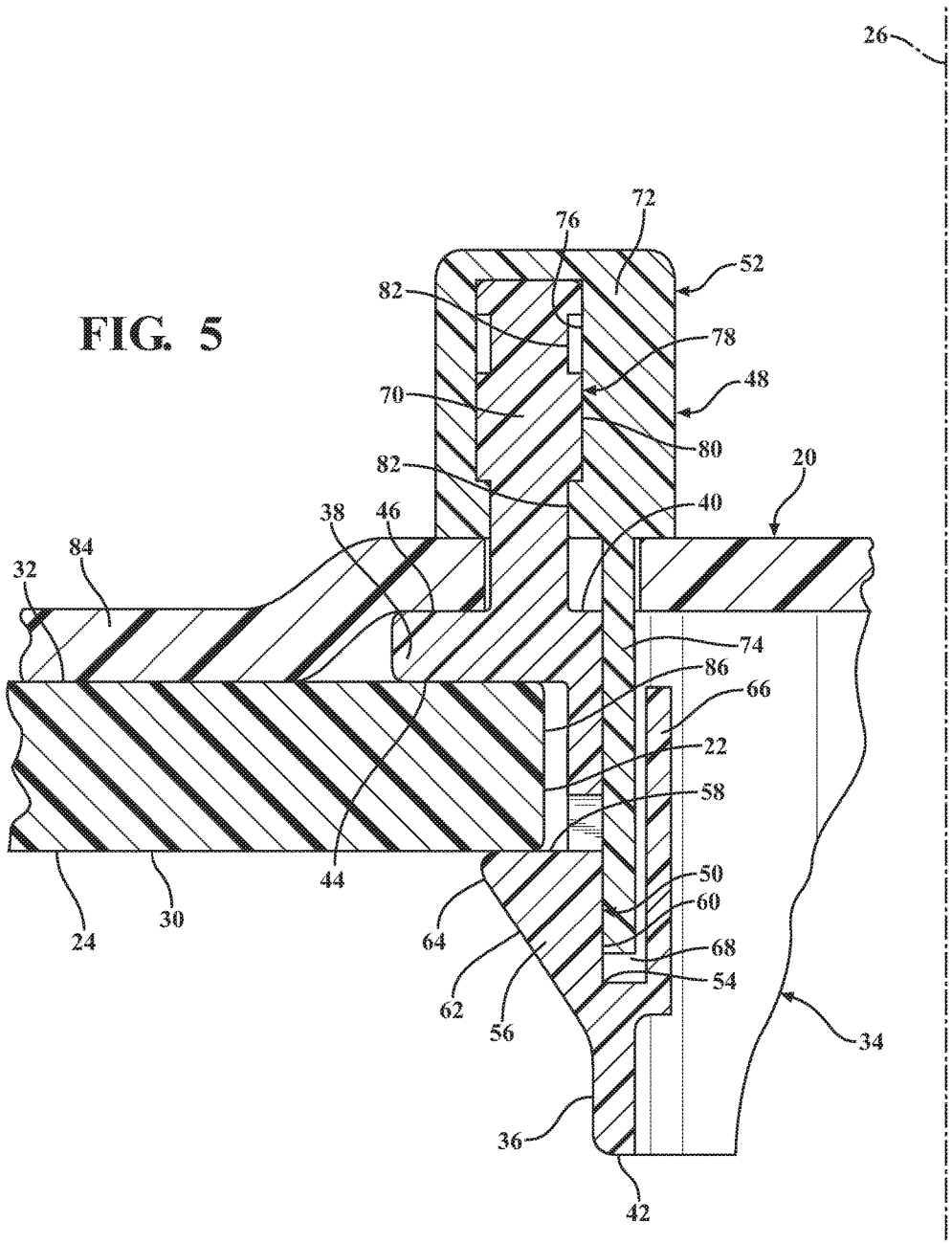
FIG. 5 is a schematic fragmentary cross sectional view of the seal assembly positioned within the opening of the panel, showing the locking pin in a locking position.

As noted above, the panel 24 defines the opening 22. As best shown in FIGS. 3-5, the panel 24 includes an interior surface 30 and an exterior surface 32. In the exemplary embodiment, the interior surface 30 may be the surface of the panel 24, i.e., bulkhead, that is disposed within a passenger compartment of the vehicle, and the exterior surface 32 may be the surface of the panel 24, i.e., the bulkhead, that is disposed within the engine compartment of the vehicle. The shaft 28 extends through the opening 22 in the panel 24. The specific configuration of the shaft 28 is not pertinent to the teachings of this disclosure, and are therefore not described in detail herein. The seal assembly 20 interconnects the shaft 28 and the panel 24, and seals the opening 22 in the panel 24, between the panel 24 and the shaft 28.

Referring to FIG. 2, the seal assembly 20 includes a body 34. The body 34 has a wall 36 and a flange 38. The wall 36 extends along the central axis 26, between a first end 40 and a second end 42. The wall 36 may be solid, or as shown, be formed by several different segmental sections that generally cooperate to form the wall 36, which extends around the periphery of the opening 22. As noted above, the wall 36 extends along the central axis 26. As such, the wall 36 extends generally parallel with the central axis 26, and perpendicular to the panel 24.

The flange 38 is attached to the first end 40 of the wall 36, and extends outward from the wall 36 and away from the central axis 26. The flange 38 includes a first surface 44 disposed against the exterior surface 32 of the panel 24, and an opposing second surface 46. The flange 38 may form a solid ring around the opening 22, or as shown, may be formed by several different segments the generally cooperate to form the flange 38. Once installed, the first side of the flange 38 engages the interior surface 30 of the panel 24 in abutting engagement.

Referring to FIG. 2, the body 34 further includes one or more latching features 48. As shown in the Figures, the seal assembly 20 includes three different latching features 48 annularly spaced about the central axis 26. Each of the latching features 48 may be similarly constructed. As such, the latching features 48 are described herein with reference to only a single latching feature 48. However, it should be appreciated that the description of the latching feature 48 is applicable to all of the latching features 48 of the seal assembly 20. Furthermore, while the exemplary embodiment of the seal assembly 20 shows three latching features 48, it should be appreciated that the seal assembly 20 may include any number of latching features 48. The specific number of latching features 48 will depend on the size of the opening 22, the tightness of the seal desired, etc. For example, the seal assembly 20 may include only a single latching feature 48, two latching features 48, three, four, five, or more latching features 48.

Referring to FIGS. 3 through 5, the latching feature 48 includes a detent 50 and a locking pin 52. The detent 50 is attached to the wall 36 at a hinge 54. The hinge 54 is disposed adjacent or near the second end 42 of the wall 36. The detent 50 includes a latch portion 56, which extends from the hinge 54, axially along the central axis 26, to a distal engagement surface 58. The engagement surface 58 is disposed transverse relative to the central axis 26. The first surface 44 of the flange 38 is generally parallel with and axially spaced apart from the engagement surface 58, along the central axis 26, with the panel 24 secured therebetween. As shown, the latch portion 56 includes a radially inner wall 60 that extends generally parallel with the central axis 26, and a radially outer wall 62 extending or angled relative to the central axis 26 wall 36 to form a ramp 64. The radially inner wall 60 and the radially outer wall 62 each extend from the hinge 54 to the engagement surface 58. The hinge 54 may simply be a portion of the detent 50 that is connected to the second end 42 of the wall 36, and need not include a complex mechanical rotating device. The detent 50 is bendable or rotatable relative to the wall 36, about the hinge 54, in a radial direction relative to the central axis 26. Accordingly, the detent 50 may bend or rotate about the hinge 54, inward toward the central axis 26 (such as shown in FIG. 3) or outward away from the central axis 26.

The detent 50 includes a back plate 66 that is attached to the latch portion 56. The back plate 66 extends axially along the central axis 26, and is radially spaced inward of the latch portion 56 relative to the central axis 26 to define a channel 68 between the radially inner wall 60 of the latch portion 56 and the back plate 66.

Figure 6:
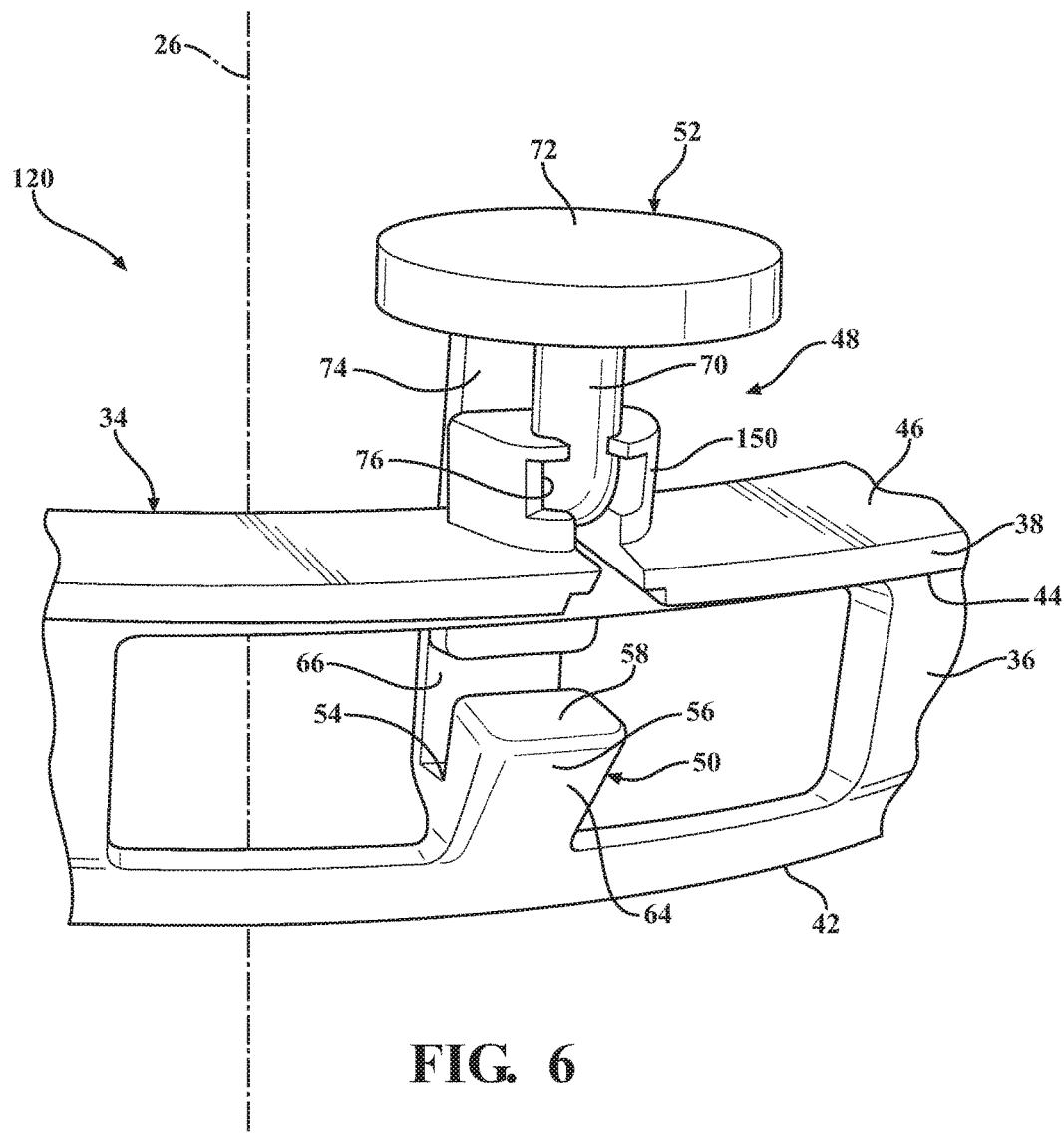
FIG. 6 is a schematic fragmentary perspective view of an alternative embodiment of the seal assembly.

One of the body 34 and the locking pin 52 includes a post 70 extending axially along the central axis 26, and the other of the body 34 and the locking pin 52 includes a cavity 76 slideably supporting the post 70. FIGS. 2 through 5 show a first embodiment of the seal assembly 20, in which the body 34 includes the post 70, and the locking pin 52 includes the cavity 76. FIG. 6 shows an alternative embodiment of the seal assembly 20, in which the body includes the cavity 76, and the locking pin 52 includes the post 70. Referring to FIGS. 3-5, the body 34 includes the post 70 extending upward from the flange 38, axially along the central axis 26 and away from the wall 36 of the body 34. Accordingly, the post 70 extends from the flange 38 in a first direction along the central axis 26, and the wall 36 extends from the flange 38 in a second opposite direction along the central axis 26. The post 70 slideably supports the locking pin 52.

The locking pin 52 includes a head portion 72 and a stem portion 74. The stem portion 74 extends axially along the central axis 26, from the head portion 72. The head portion 72 is disposed adjacent the second surface 46 of the flange 38, with the stem portion 74 extending downward, toward the second end 42 of the wall 36 and the detent 50. The head portion 72 defines the cavity 76, with the post 70 slideably disposed within the cavity 76 to support the locking pin 52 relative to the body 34.

Referring to FIG. 6, the alternative embodiment of the seal assembly is generally shown at 120. The seal assembly 120 includes the body 34 having a structure 150 extending upward from the flange 38, axially along the central axis 26 and away from the wall 36 of the body 34. Accordingly, the structure 150 extends from the flange 38 in a first direction along the central axis 26, and the wall 36 extends from the flange 38 in a second opposite direction along the central axis 26. The structure 150 defines the cavity 76. The locking pin 52 includes the post 70 extending downward from the head portion 72, axially along the central axis 26. The post 70 is slideably supported by the cavity 76 relative to the body 34.

The locking pin 52 is axially moveable along the central axis 26, between an insertion position, shown in FIGS. 3 and 4, and a locking position, shown in FIG. 5. When the locking pin 52 is disposed in the insertion position, the locking pin 52 is disengaged from the detent 50 to allow the detent 50 to bend about the hinge 54 relative to the central axis 26. More specifically, when the locking pin 52 is disposed in the insertion position, the stem portion 74 is disengaged from the channel 68. When the locking pin 52 is disposed in the locking position, the locking pin 52 is engaged with the detent 50 to prevent the detent 50 from bending about the hinge 54 relative to the central axis 26. More specifically, when the locking pin 52 is disposed in the locking position, the stem portion 74 is disposed within the channel 68, in abutting engagement with both the radially inner wall 60 of the latch portion 56 and the back plate 66.

The latching feature 48 may include a tactile feature 78 to provide a tactile signal to an installer when the locking pin 52 moves between the insertion position and the locking position. As used herein, the term "tactile signal" is defined as a signal that is perceived by touch, such as a vibration or shock. Accordingly, the tactile signal is a signal that is felt by the touch of the installer. At least one of the post 70 and/or the locking pin 52 may include the tactile feature 78. For example, and as shown in FIGS. 3 through 5, the tactile feature 78 may include a ridge 80 disposed on an exterior radial surface of the post 70, and a lip 82 disposed on an interior radial surface of the cavity 76 in the head portion 72 of the locking pin 52. As the locking pin 52 moves relative to the post 70, between the insertion position and the locking position, the lip 82 slides over the ridge 80, thereby generating the tactile signal which the installer may feel. As shown in FIGS. 3 and 4, the lip 82 is positioned on a first side of the ridge 80 when the locking pin 52 is disposed in the insertion position. As shown in FIG. 5, the lip 82 is disposed on a second side of the ridge 80 when the locking pin 52 is disposed in the locking position. Accordingly, upon the installer feeling the tactile signal, the installer may know that the pin has either been raised into the insertion position, or lowered into the locking position.

The seal assembly 20 further includes a seal member 84. The seal member 84 is attached to the flange 38, and is disposed in sealing engagement with the panel 24 and the shaft 28. When the locking pin 52 is disposed in the locking position, the head portion 72 of the locking pin 52 is disposed in sealing engagement with an outer surface of the seal member 84. The seal member 84 may include any device capable of sealing against the panel 24 and the shaft 28. The specific configuration of the seal member 84, as well as the materials used to manufacture the seal member 84, are not pertinent to the teachings of this disclosure, and are therefore not described in detail herein. It should be appreciated that the body 34 of the seal assembly 20 is used to attach the seal member 84 to the panel 24.

Referring to FIG. 3, the locking pin 52 is disposed in the insertion position, such that the locking pin 52 is not engaged with the latch portion 56 of the detent 50. When the wall 36 of the body 34 is inserted through the opening 22 in the panel 24, the ramp 64 on the latch portion 56, formed by the radially outer wall 62 of the latch portion 56, engages an edge surface 86 of the panel 24 defining the opening 22, such that the edge surface 86 forces the latch portion 56 to bend inward toward the central axis 26 about the hinge 54. Bending the latch portion 56 inward toward the central axis 26 allows the body 34, and particularly the latch portion 56 of the detent 50, to pass through the opening 22. Referring to FIG. 4, the body 34 of the seal assembly 20 is shown completely inserted through the opening 22 in the panel 24, with the panel 24 positioned between the flange 38 and the engagement surface 58 of the latch portion 56. The locking pin 52 is still in the insertion position. Referring to FIG. 5, the locking pin 52 is shown in the locked position. The locking pin 52 is moved from the insertion position, shown in FIGS. 3 and 4, into the locking position, shown in FIG. 5, with the application of a force along the central axis 26. As the locking pin 52 moves relative to the post 70, the lip 82 in the head portion 72 of the locking pin 52 slides over the ridge 80 on the post 70, and "snaps back" when the locking pin 52 is fully positioned within the locking position, thereby providing the tactile signal to the installer that the locking pin 52 is fully inserted and properly installed. With the locking pin 52 disposed in the locking position, the stem portion 74 of the locking pin 52 is disposed within the channel 68 of the latch portion 56, thereby preventing the latch portion 56 from bending or rotating about the hinge 54, and keeping the panel 24 secured between the engagement surface 58 and the flange 38.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

The invention claimed is:

1. A seal assembly for sealing between a panel and a shaft extending through an opening in the panel, the seal assembly comprising:
   a body having a wall extending along a central axis between a first end and a second end, and a flange attached to the first end of the wall and extending outward from the wall and away from the central axis;
   wherein the body includes a detent attached to the wall at a hinge disposed adjacent the second end of the wall, with the detent bendable about the hinge in a radial direction relative to the central axis; and
   a locking pin axially moveable along the central axis, between an insertion position and a locking position, with the locking pin disengaged from the detent when disposed in the insertion position to allow the detent to bend about the hinge relative to the central axis, and with the locking pin engaging the detent when disposed in the locking position to prevent the detent from bending about the hinge relative to the central axis.

2. The seal assembly set forth in claim 1, wherein one of the body and the locking pin includes a post extending axially along the central axis, and the other of the body and the locking pin includes a cavity slideably supporting the post.

3. The seal assembly set forth in claim 2, wherein the body includes the post extending from the flange, axially along the central axis and away from the wall of the body, and the locking pin includes the cavity, with the cavity slideably supporting the post.

4. The seal assembly set forth in claim 2, wherein the body includes the cavity, and the locking pin includes the post, with the cavity slideably supporting the post.

5. The seal assembly set forth in claim 1, wherein at least one of the body and the locking pin includes a tactile feature operable to provide a tactile signal when the locking pin moves between the insertion position and the locking position.

6. The seal assembly set forth in claim 5, wherein the tactile feature includes a ridge and a lip, such that the lip slides over the ridge as the locking pin moves between the insertion position and the locking position.

7. The seal assembly set forth in claim 1, wherein the detent includes a latch portion extending from the hinge, axially along the central axis, to a distal engagement surface, with the engagement surface disposed transverse relative to the central axis.

8. The seal assembly set forth in claim 7, wherein the flange includes a first surface generally parallel with and axially spaced apart from the engagement surface, along the central axis, for securing a panel therebetween.

9. The seal assembly set forth in claim 7, wherein the detent includes a back plate extending axially along the central axis and radially spaced inward of the latch portion relative to the central axis to define a channel between the latch portion and the back plate.

10. The seal assembly set forth in claim 9, wherein the locking pin includes a stem portion extending axially along the central axis, wherein the stem portion is disengaged from the channel when the locking pin is disposed in the insertion position, and wherein the stem portion is disposed within the channel in abutting engagement with both the latch portion and the back plate when the locking pin is disposed in the locking position.

11. A vehicle comprising:
    a panel defining an opening extending through the panel along a central axis, the panel having an interior surface and an exterior surface;
    a shaft extending through the opening in the panel;
    a seal assembly interconnecting the shaft and the panel for sealing the opening in the panel between the panel and the shaft, the seal assembly including:
        a body having a wall extending along the central axis between a first end and a second end;
        a flange attached to the first end of the wall and extending outward from the wall and away from the central axis, the flange having a first surface disposed against the exterior surface of the panel, and an opposing second surface;
        wherein the body includes a latching feature having a detent and a locking pin, with the detent attached to the wall at a hinge disposed adjacent the second end of the wall, and with the detent bendable about the hinge in a radial direction relative to the central axis; and
        wherein the locking pin is axially moveable along the central axis, between an insertion position and a locking position, with the locking pin disengaged from the detent when disposed in the insertion position to allow the detent to bend about the hinge relative to the central axis, and with the locking pin engaging the detent when disposed in the locking position to prevent the detent from bending about the hinge relative to the central axis; and
        a seal member attached to the flange and in sealing engagement with the shaft.

12. The vehicle set forth in claim 11, wherein one of the body and the locking pin includes a post extending axially along the central axis, and the other of the body and the locking pin includes a cavity slideably supporting the post.

13. The vehicle set forth in claim 11, wherein at least one of the body and the locking pin includes a tactile feature operable to provide a tactile signal when the locking pin moves between the insertion position and the locking position.

14. The vehicle set forth in claim 13, wherein the tactile feature includes a ridge and a lip, such that the lip slides over the ridge as the locking pin moves between the insertion position and the locking position.

15. The vehicle set forth in claim 11, wherein the locking pin includes a head portion, with the head portion of the locking pin disposed in sealing engagement with an exterior surface of the seal member when the locking pin is disposed in the locking position.

16. The vehicle set forth in claim 11, wherein the detent includes a latch portion extending from the hinge, axially along the central axis, to a distal engagement surface, with the engagement surface disposed transverse relative to the central axis, and with the first surface of the flange generally parallel with and axially spaced apart from the engagement surface, along the central axis, with the panel secured therebetween.

17. The vehicle set forth in claim 16, wherein the detent includes a back plate extending axially along the central axis and radially spaced inward of the latch portion relative to the central axis to define a channel between the latch portion and the back plate.

18. The vehicle set forth in claim 17, wherein the locking pin includes a stem portion extending axially along the central axis, wherein the stem portion is disengaged from the channel when the locking pin is disposed in the insertion position, and wherein the stem portion is disposed within the channel in abutting engagement with both the latch portion and the back plate when the locking pin is disposed in the locking position.

19. The vehicle set forth in claim 11, wherein the body includes a plurality of latching features annularly spaced about the central axis, with each of the plurality of latching features including a detent and a locking pin.

* * * * *